(12) United States Patent
Yahata et al.

(10) Patent No.: US 7,577,340 B2
(45) Date of Patent: Aug. 18, 2009

(54) DEVICE AND METHOD FOR RECORDING REAL-TIME DATA

(75) Inventors: Hiroshi Yahata, Kadoma (JP); Hiroshi Hamasaka, Hirakata (JP); Katsuhiko Miwa, Moriguchi (JP); Yosuke Uemondo, Kadoma (JP); Takenori Maehashi, Katano (JP)

(73) Assignee: Panasonic Corporation, Osaka (JP)

( * ) Notice: Subject to any disclaimer, the term of this patent is extended or adjusted under 35 U.S.C. 154(b) by 758 days.

(21) Appl. No.: 11/184,006

(22) Filed: Jul. 18, 2005

(65) Prior Publication Data

US 2006/0077472 A1 Apr. 13, 2006

(30) Foreign Application Priority Data

Jul. 21, 2004 (JP) ............................. 2004-212741

(51) Int. Cl.
H04N 7/26 (2006.01)
(52) U.S. Cl. ............................ 386/124; 386/40; 386/83; 386/88; 386/129
(58) Field of Classification Search .................. 386/46, 386/95, 124, 126
See application file for complete search history.

(56) References Cited

U.S. PATENT DOCUMENTS

| 5,701,383 | A | * | 12/1997 | Russo et al. | .................. 386/46 |
| 7,280,743 | B2 | * | 10/2007 | Shibutani | ..................... 386/111 |
| 7,447,422 | B2 | * | 11/2008 | Okuyama | .................... 386/125 |
| 2003/0206584 | A1 | * | 11/2003 | Morita et al. | .......... 375/240.02 |
| 2003/0223737 | A1 | | 12/2003 | Shibutani | |
| 2003/0228131 | A1 | * | 12/2003 | Miyazawa | .................... 386/46 |
| 2007/0104463 | A1 | * | 5/2007 | Ono et al. | .................... 386/112 |

FOREIGN PATENT DOCUMENTS

JP          2004-5853          1/2004

* cited by examiner

Primary Examiner—Thai Tran
Assistant Examiner—Helen Shibru

(57) ABSTRACT

The navigation generator 12 sets the time length of a VOB to a time length that is determined in advance depending on a scheduled recording time H. Even if a user makes an operation to stop the recording before the time length of a recorded part of the VOB equals the predetermined time length, the VOB of the predetermined time length is recorded onto a DVD±R. Cell information specifying the part of the VOB preceding the point corresponding to the recording stop is generated. Then, PGC information containing the Cell information is recorded onto the DVD±R.

5 Claims, 15 Drawing Sheets

FIG.6

| Scheduled Recording Time H [h] | Average Playback Time per Cell [sec] | Maximum Playback Time per Cell [sec] | Largest FWDI | Memory Hold Time for Setting Largest FWDI [sec] | Average Recording Rate [Mbps] | Maximum Recording Rate [Mbps] |
|---|---|---|---|---|---|---|
| | Recording Time/253 | | | | 8.5 GB/ Recording Time | 32 MB/Memory Hold Time (e.g.) |
| 2 | 28.4 | Less than 30 sec | FWDI 20 | 10 | 9.44 | 26.8 |
| 4 | 56.9 | Less than 60 sec | FWDI 60 | 30 | 4.72 | 8.95 |
| 6 | 85.4 | Less than 120 sec | FWDI 120 | 60 | 3.15 | 4.47 |
| 8 | 114 | Less than 120 sec | FWDI 120 | 60 | 2.36 | 4.47 |
| 10 | 142 | Less than 10 h | FWDI 240 | 120 | 1.89 | 2.24 |
| 12 | 171 | Less than 12 h | FWDI 240 | 120 | 1.57 | 2.24 |
| 14 | 199 | Less than 14 h | FWDI 240 | 120 | 1.35 | 2.24 |
| 16 | 288 | Less than 16 h | FWDI 240 | 120 | 1.18 | 2.24 |

FIG. 13

Structure of First Dummy VOBU in Cell Info#k (a) | NV_PCK | V_PCK (Black Picture) | A_PCK (Silent Digital 0 Data) | ... |

(b) | NV_PCK | V_PCK (Picture Adj to Rec Stop) | A_PCK (Audio Data Adj to Rec Stop) | ... |

(c) | NV_PCK | V_PCK Only |

(d) | NV_PCK | V_PCK (Picture Adj to Rec Stop) |

Structure of Following Dummy VOBUs in Cell Info#k (May be Identical to First Dummy VOBU Structure)

(e) | NV_PCK | A_PCK (Silent Digital 0 Data) Only |

(f) | NV_PCK | Provider Defined Stream | Provider Defined Stream Only |

(g) | NV_PCK |

DEVICE AND METHOD FOR RECORDING REAL-TIME DATA

BACKGROUND OF THE INVENTION (1) Field of the Invention

The present invention relates to a real-time recording technique applicable to logical formats of read-only media.

(2) Description of the Related Art

A real-time recording technique is for encoding and recording video and audio signals that are sequentially input to a device, onto a recording medium in real time. One problem involved in real-time recording is "data requiring future prediction". Data requiring future prediction used herein refers to data items, among those defined according to the logical format of the recording medium, having dependency on data to be generated after the current encoding time.

Normally, a logical format for read-only media is defined on a precondition that the volume image per optical disc is fixed before producing an original master for mass production. This concept of recording data after fixing the volume image per optical disc contradicts the concept of real-time recording signals input to a device, by sequentially encoding the signals in real time.

Consequently, when a recording device encodes and records data in real time according to a logical format defined for read only media, many of the data items turn out to be "data items requiring future prediction". One exemplary logical format for read only media is called "DVD-Video". When encoding and recording data by a recording device in real time according to this DVD-Video format, various data items contained in NV packs (navigation packs) require future prediction.

The "NV pack" mentioned herein is a pack of management data generated one for a predetermined number of GOPs (Groups of Pictures). Each time the encoder has generated the predetermined number of GOPs, the recording device generates an NV pack and multiplexes the NV pack, the GOPs, and audio data. The multiplexed data is called a VOBU (Video Object Unit). By generating a sequence of VOBUs, video and audio data digitized according to the DVD-Video format are recorded in units called VOBs (Video Objects). Among data items contained in each NV pack, the data items called FWDI 20, FWDI 60, FWDI 120, FWDI 240, and VOB_V_E_PTM are "data requiring future prediction". The FWDI 20, FWDI 60, FWDI 120, and FWDI 240 in a specific NV pack indicate the numbers of packs present between the specific NV pack and the NV packs that belong to respective VOBUs containing picture data to be displayed 10 sec, 30 sec, 60 sec, and 120 sec after the video playback start time of the VOBU to which the specific NV pack belongs. That is to say, the content of each FWDI cannot be determined until encoding of the relative VOBU that is tens or even hundreds after the current VOBU are encoded.

However, in the case of recording media of a write-once type, such as DVD-R and DVD±R discs (hereinafter, collectively referred to as DVD±R), once VOBUs are recorded onto the DVD±R, it is no longer possible to modify the contents of FWDIs.

For this reason, it is required to hold VOBUs on a memory until the sizes of VOBUs tens and hundreds after a current VOBU are fixed. It is only after the sizes of those VOBUs are determined that the FWDI 20, FWDI 60, FWDI 120, and FWDI 240 can be set and the current VOBU are recorded onto the DVD±R.

In order to wait for VOBUs hundreds after a current VOBU to be generated, the above processing requires the memory to have a large capacity enough to temporally hold hundreds of VOBUs. As described above, when recording onto a write-once type recording medium, numerous VOBUs need be held on the memory before data items of each NV packs are determined. Consequently, a large-sized memory needs to be installed, which makes it difficult to reduce the cost of recording device.

SUMMARY OF THE INVENTION

Therefore, the present invention aims is to provide, without the need for a large scale memory, a recording device capable of recording data in real time according to a logical format containing "data requiring future prediction".

Conventionally, it is common to provide a recording device with a memory having enough capacity to store an entire digital stream (VOB). With such a conventional structure, a digital stream (VOB) is held on the memory until the VOB_V_E_PTM and FWDIs of every NV pack is determined, and then the digital stream (VOB) is recorded on to a write-once type recording medium. Since the entire digital stream (VOB) is held on the memory, the size of digital stream (VOB) is limited to the memory size. The digital stream is encoded by variable length coding. Thus, with a low bit rate, the time length of the digital stream becomes longer, whereas the time length of the digital stream becomes shorter with a high bit rate. Conventionally, the digital stream is encoded and recorded onto a DVD±R so as to satisfy the relation "VOB Size=Memory Size".

Contrary to the conventional scheme, the present invention is made by adopting the concept of fixing the time length of a digital stream (VOB). By setting the upper limit (fixed value) to the time length of a digital stream (VOB), data items requiring future prediction contained in stream units (VOBU) are determined in advance. However, a recording process normally begins and ends in response to a start operation and a stop operation by a user. Thus, the concept of fixing the time length of the digital stream in advance contradicts the way to carry out the recording process as above.

In order to reconcile the above contradiction and achieve the above aim, the present invention provides a recording device for recording a digital stream onto a recording medium after determining a time length of the digital stream to be recorded. The recording device includes: a first control unit operable to record the digital stream onto the recording medium for the determined time length, even if a user makes a stop operation before the determined time length is reached; a generating unit operable to generate playback section information specifying, as a playback section, a part of the digital stream recorded up to a point at which the stop operation is made; and a second control unit operable to record playback path information containing the playback section information onto the recording medium.

That is, instead of fixing the time length of the digital stream, the part of the digital stream recorded up to the recording stop point is specified by playback section information.

In addition, the playback path information containing the playback section information is recorded onto the recording medium. Thus, the part of the digital stream recorded up to the recording stop point is supplied for playback for users. On the other hand, the part of the digital stream subsequent to the recording stop point is not supplied for playback. That is, problems that would otherwise be caused by fixing the time length of the digital stream in advance are removed. Thus, it is no longer necessary for holding numerous stream units (VOBUs) on the memory to wait for data requiring future prediction to be determined.

The above arrangement makes it possible to minimize the memory size required for holding stream units (VOBUs) until the data elements of NV packs are determined. As a consequence, the cost of recording devices can be reduced and brought into use in a numerous households.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6 is a table showing, for each of a plurality of values 2, 4, 6, 8, 10, 12, 14, and 16 that the scheduled recording time H may take, the values of "Average Playback Time per Cell", "Maximum Playback Time per Cell", "Largest FWDI", "Hold Time of Memory needed for Setting Largest FWDI", "Average Recording Rate", and "Maximum Recording Rate";

FIGS. 13A-13G show examples of the data structures of dummy VOBUs recorded as Cell info #k;

DESCRIPTION OF THE PREFERRED EMBODIMENT

Figure 1:
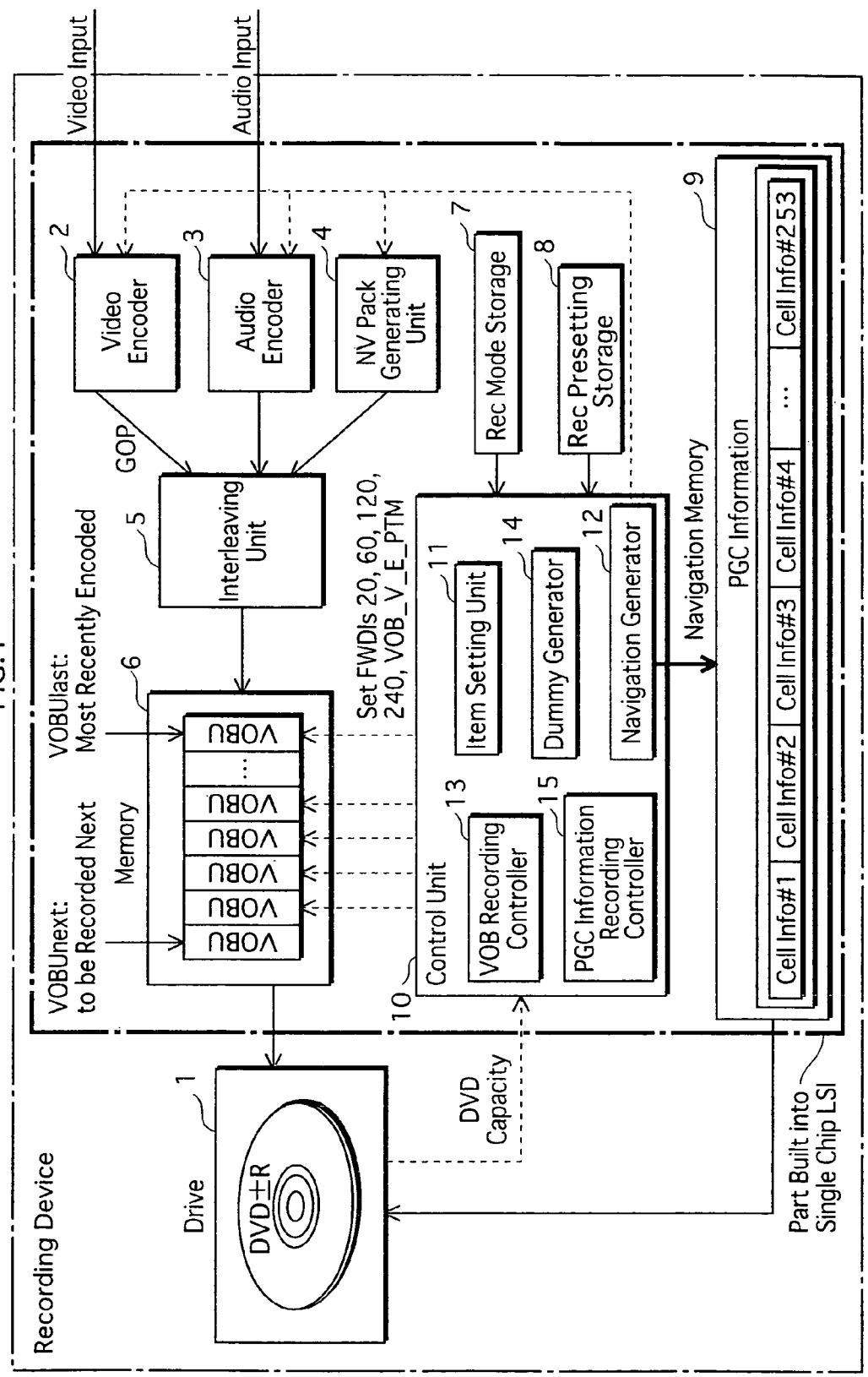
FIG. 1 is a view showing the internal structure of a recording device according to an embodiment of the present invention.

Hereinafter, a description is given to the internal structure of a recording device according to the present invention. FIG. 1 is a view showing the internal structure of the recording device. As shown in the figure, the recording device is composed of a drive device 1, a video encoder 2, an audio encoder 3, an NV pack generating unit 4, an interleaving unit 5, a memory 6, a recording-mode storage unit 7, a record presetting storage unit 8, a navigation memory 9, and a control unit 10. In the figure, a portion enclosed within the thick dashed line is built into a single chip LSI, but this structure is presented merely as an example. Alternatively, the memory 6, the recording-mode storage unit 7, the record presetting storage unit 8, and the navigation memory 9 may be provided outside the single chip LSI.

Description of Recording Device—Part 1—From Drive Device 1 to Interleaving Unit 5

The drive device 1 loads/ejects a DVD±R and writes data onto the DVD±R.

The video encoder 2 encodes input video signals to generate GOPs each of which is 0.4-0.6 sec long.

The audio encoder 3 encodes input audio signals to generate audio data.

The NV pack generating unit 4 generates NV packs defined according to the DVD-Video standard.

The interleaving unit 5 converts GOPs generated by the video encoder 2, audio data generated by the audio encoder 3, and NV packs generated by the NV pack generating unit 4 into separate sequences of packs, and multiplexes the packs to generate VOBUs.

(Description of VOBU—Part 1—Overall Structure)

Figure 2:
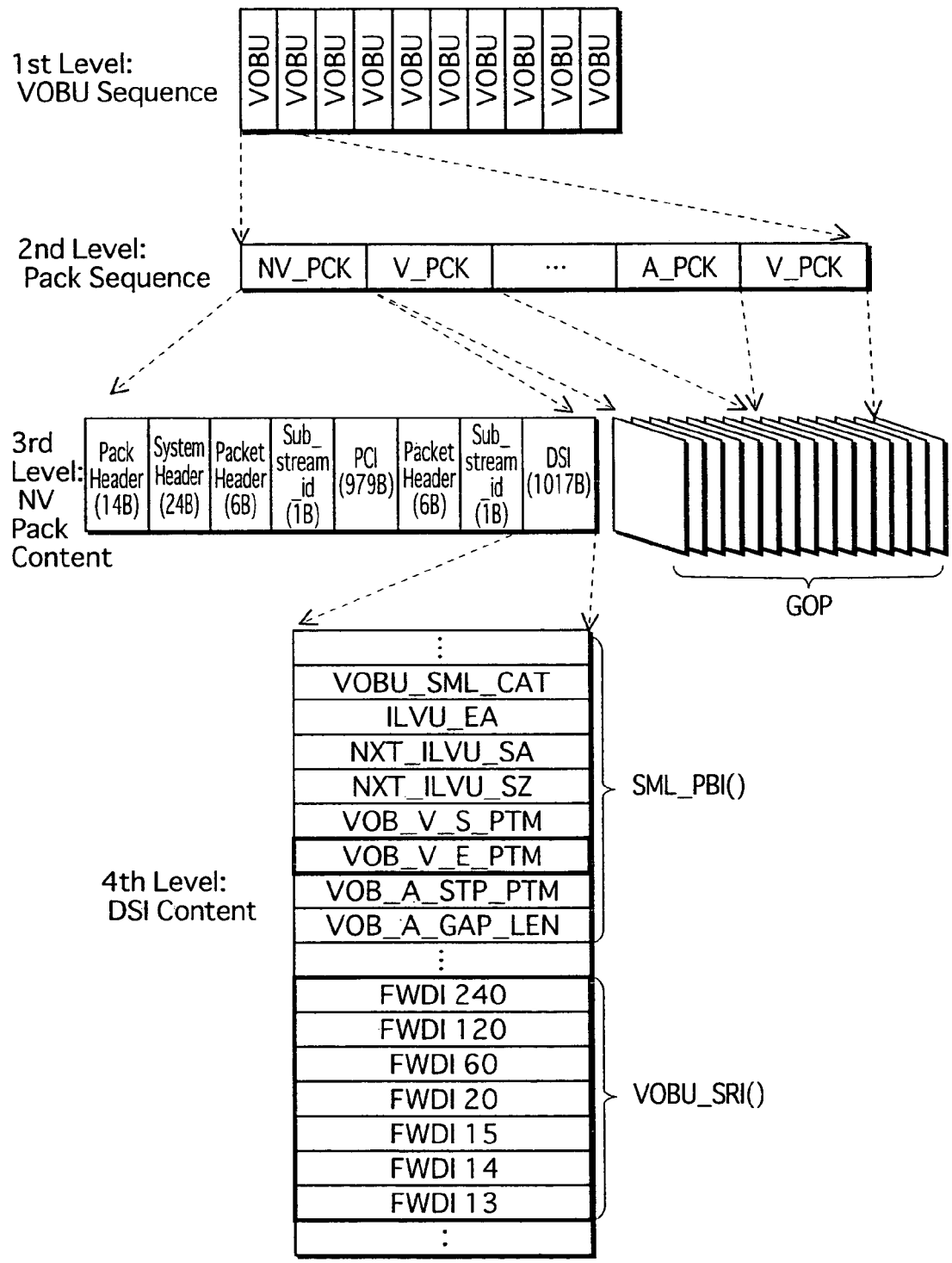
FIG. 2 is a view showing VOBUs generated by an interleaving unit 5.

Hereinafter, a description is given to VOBUs generated by the interleaving unit 5. FIG. 2 is a view showing VOBUs generated by the interleaving unit 5. In the figure, the first level shows a sequence of VOBUs and the second level shows a sequence of packs contained in one of the VOBUs.

As the second level shows, each VOBU is composed of an integer number of packs. The first pack is an NV pack (NV_PCK) followed by video packs (V_PCK) and audio packs (A_PCK). VOBUs are data units each of which, except for the last VOBU in a VOB, is equivalent in length to a video playback time of from 0.4 to 1.0 sec.

The third level shows the data structure of NV pack (NV_PCK) on the left and the contents of video packs (V_PCK) on the right. Unlike a common DVD pack structure, each NV pack in this embodiment contains two packets. The respective packets are referred to as a PCI (Presentation Control Information) packet and a DSI (Data Search Information) packet. The DSI packet contains information used for performing trick mode playback, such as information indicating the relative positions of adjacent VOBUs with respect to the VOBU to which the DSI packet belongs.

(Description of VOBU—Part 2—DSI)

What matters in real-time recording of data according to the DVD-Video format is that DSI packets contain data requiring future prediction. In view of this, a description is given to DSI packets.

Each DSI packet contains: a recording address used for performing seamless playback of VOBs; a data item called SML_PBI (Seamless Playback Information) composed of playback information and other information; and a data item called VOBU_SRI (VOB Unit Search Information) composed of recording addresses of VOBUs adjacent to the VOBU to which the DSI packet belongs.

The fourth level shows the structure of SML_PBI and VOBU_SRI contained in the NV pack. An important data item in the SML_PBI is called VOB_V_E_PTM.

The "VOB_V_E_PTM" indicates the video playback end time of the VOB to which the NV pack belongs.

In the VOBU_SRI, an important data item is called "FWDI n".

The "FWDI n (where n=240, 120, 60, 20, 15, 14, 13)" of a specific NV pack indicates the relative number of packs present before the NV pack that belongs to the VOBU containing picture date to be played back n×0.5 sec after the playback start time of the VOBU to which the specific NV pack belongs. In the case where there is no VOBU containing picture data corresponding to a specified playback time within the same Cell, the value of that FWDI n is set to "0x3FFFFFFF (invalid value)".

This concludes the description of VOBUs generated by the interleaving unit 5.

Now, the discussion goes back to the internal structure of the recording device.

Description of Recording Device—Part 2—From Memory 6 to Control Unit 10

The memory 6 is FIFO memory storing VOBUs generated by the video encoder 2, the audio encoder 3, the NV pack generating unit 4, and the interleaving unit 5, in a manner that the VOBUs are read in the order they are stored.

The recording-mode storage unit 7 stores a user-selected recording mode out of four recording modes: XP, SP, LP, and EP. Each recording mode is uniquely assigned a specific bit rate. For example, the recording mode of XP is assigned the bit rate of 10 Mbps, SP is assigned 5 Mbps, LP is assigned 2.4 Mbps, and EP is assigned 1.6 Mbps. At a push of buttons on a front panel or a remote controller of the recording device, users can switch a recording mode currently stored in the recording-mode storage unit 7 in cycles of XP→SP→LP→EP. By switching the recording mode, users are allowed to arbitrarily select a specific bit rate (image quality of recorded data).

The record presetting storage unit 8 stores a recording schedule preprogrammed by a user. To be more specific, the record presetting storage unit 8 stores a recording start time paired with a recording end time.

The navigation memory 9 stores various pieces of data, such as PGC information, indicating the navigation structure defined in accordance with the logical format of the DVD-Video standard. Such data indicating the navigation structure is held on the navigation memory 9 until the entire stream is fixed. When the entire stream is recorded onto the DVD±R, the navigation structure data is also recorded onto the DVD±R. Hereinafter, a description is given to the overall navigation structure.

Figure 5:
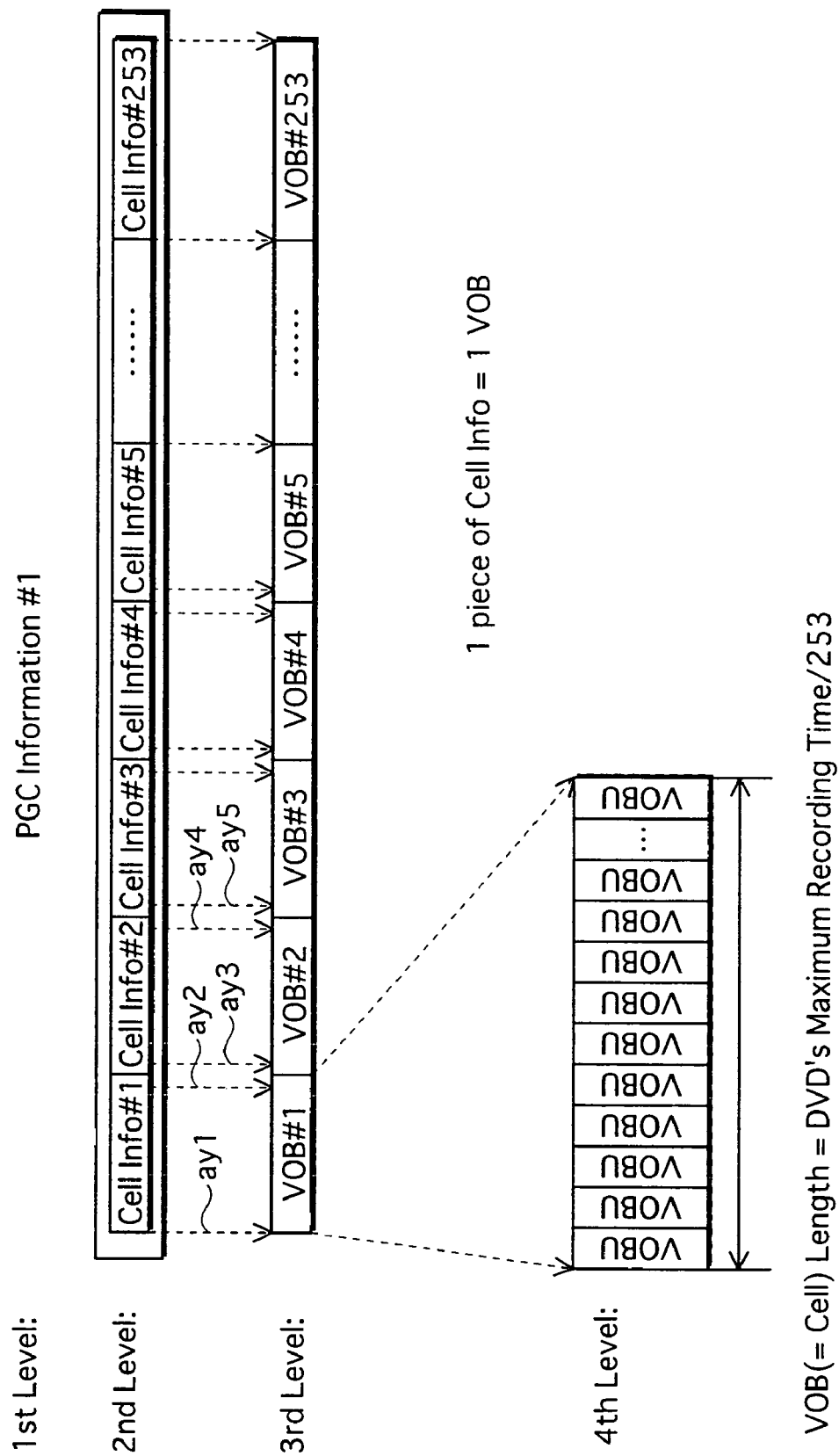
FIG. 5 is a view showing the navigation structure.

FIG. 5 shows the entire navigation structure. In the figure, the third level shows a sequence of VOBs, and the second level shows a sequence of pieces of Cell information, and the first level shows PGC information.

Each VOB (Video Object) on the third level is a complete system stream composed of multiplexed video and audio streams and contains multiple VOBUs. Time stamps of picture and audio data contained in each VOBU are given serial values throughout one VOB. That is, the video and audio streams are dully played back by a DVD player sequentially reading the VOBUs constituting the VOB and feeding the read VOBUs to its decoder. Each VOB is recorded onto the DVD±R as a file with the file name "VTS_xx_x.VOB". The notation "xx" used herein represents the number assigned to the VTS (Video Title Set) to which the VOB belongs, and "x" represents the ID assigned to the VOB. In real-time recording, normally, one VTS is recorded onto the DVD±R and thus the VTS number is assumed to be "1".

Each piece of Cell information shown on the second level defines a playback section within one VOB, using a pair of VOBU addresses at which video playback is to be started and ended. The down arrows ay1, ay2, ay3, ay4 . . . in the figure schematically represent the definitions of playback sections with such addresses. Generally, each piece of Cell information and a VOB referenced by the Cell information is collectively refereed to as a "Cell".

The PGC information shown on the first level defines, with a sequence of pieces of Cell information, a playback path composed of multiple playback sections on the VOB. The PGC information, which is composed of multiple pieces of Cell information, and the VOBs referenced by the pieces of Cell information are correctively referred to as a "Program Chain (PGC)". In the present embodiment, one PGC is handled as one recording program. Since one piece of PGC is handled as one "recording program", multiple VOBs are presented to users as one seamless playback path. In addition, even if the time stamps of non-consecutive values are assigned to a sequence of VOBUs as a result of a recording pause operation made by a user during a series of recording and thus multiple VOBs are generated, the VOBs are still handled as one unit. Specifically, for example, a user may make a recording pause operation when incoming broadcast is switched to a commercial message. In response to the recording pause operation, VOBUs constituting one and the same recording program are assigned time stamps of non-consecutive values before and after the commercial message, and thus divided into separate VOBs. The PGC mentioned above ensures that one recording program to be handled as one unit, even if the recording program is divided into multiple VOBs at a non-consecutive point resulting from a recording pause operation.

As shown in FIG. 5, each piece of PGC information is composed of maximum of 255 pieces of Cell information #1, #2, #3 . . . This concludes the description of the overall navigation structure.

The control unit 10 is physically composed of a CPU, ROM storing a program, and RAM, and controls the overall recording device. Functionally, the control unit 10 is composed of an item setting unit 11, a navigation generator 12, a VOB recording controller 13, a dummy generator 14, and a PGC information recording controller 15. Hereinafter, a description is given to the functional structure of the control unit 10.

Structure of Control Unit—Part 1—Item Setting Unit 11

Figure 3:
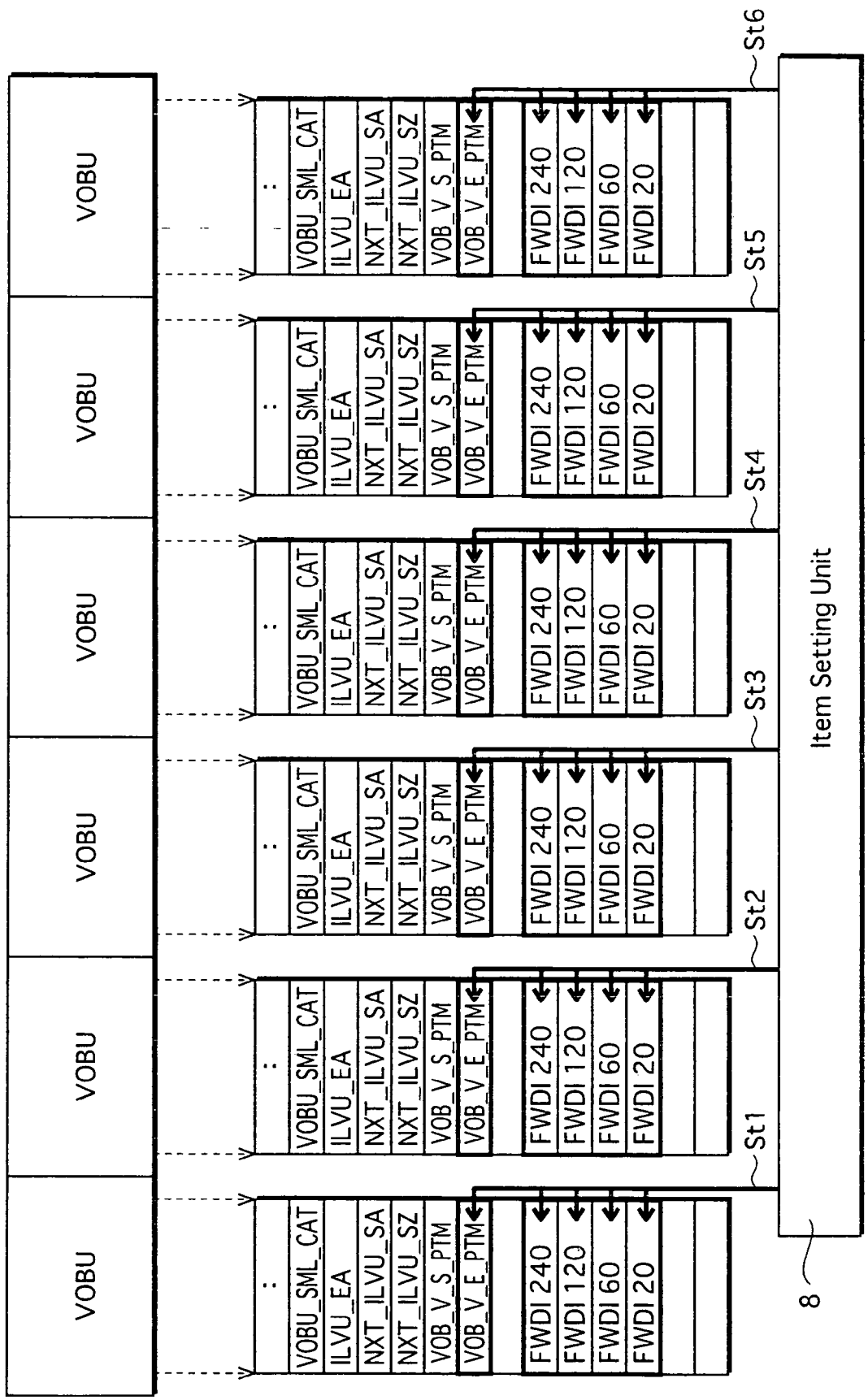
FIG. 3 is a view schematically showing the data items of an NV pack that are set by an item setting unit 11.

The item setting unit 11 sets each data item of an NV pack. FIG. 3 schematically shows setting of data items of NV packs by the item setting unit 11. Arrows St1, St2, St3, St4, St5, and St6 in the figure schematically represent that the data items are set by the item setting unit 11. As represented by the arrows, the item setting unit 11 sets a series of data items, such as FWDIs and VOB_V_E_PTM, constituting the NV pack of each VOBU held on the memory 6.

Figure 4:
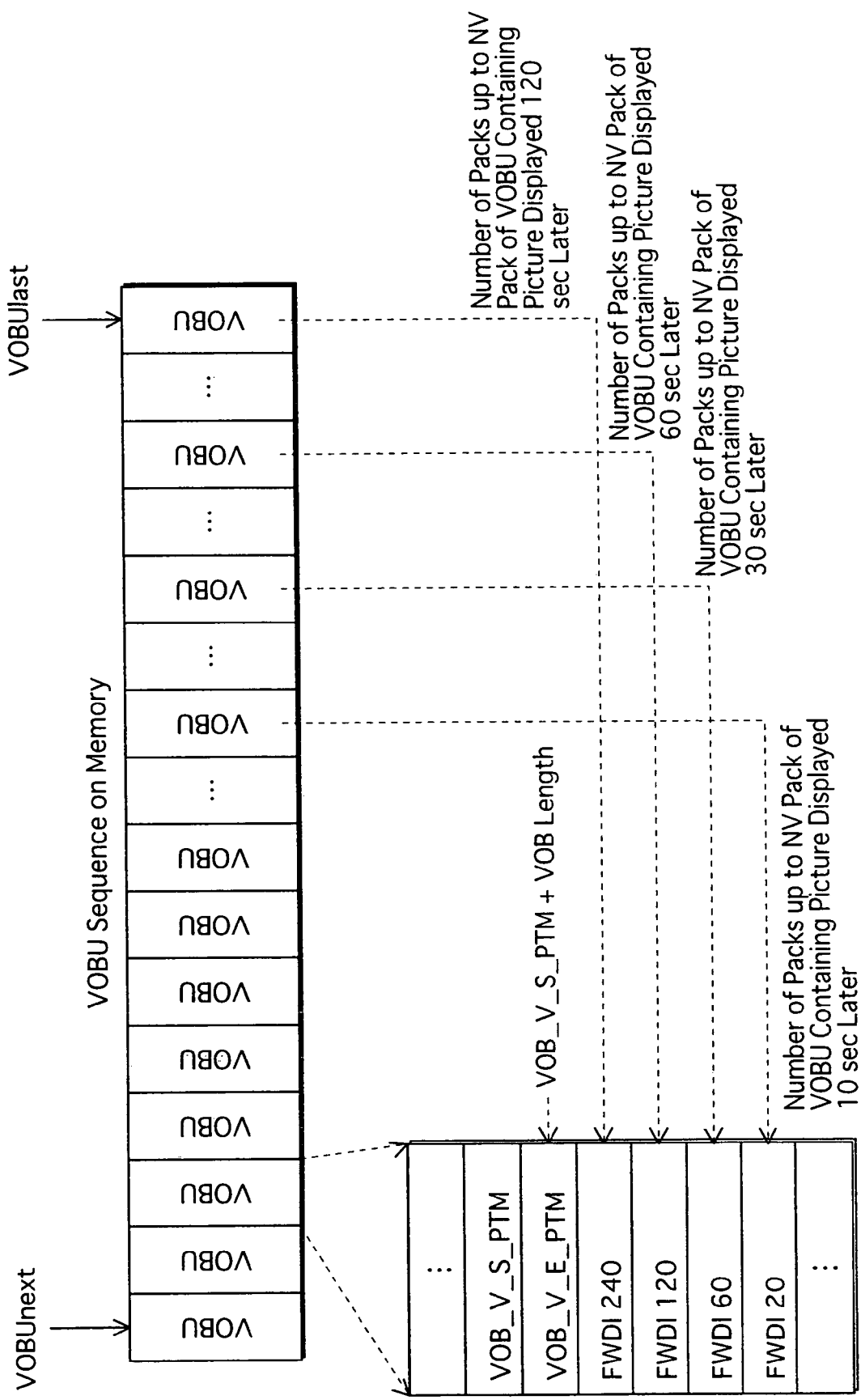
FIG. 4 is a view showing the setting of the NV pack of one VOBU.

FIG. 4 is a view showing the setting of the NV pack of one VOBU.

Once the value of VOB_V_S_PTM is determined, the value of VOB_V_E_PTM can be predicted and set in advance by adding the time length of VOB to the VOB_V_S_PTM. It is required to complete the VOB at the time indicated by the VOB_V_E_PTM set in advance, so that the VOB is sequentially recorded onto the write-once type recording medium (DVD-R and DVD±R) in compliance with the DVD-Video format.

The value of FWDI 120 indicates the number of packs present before the NV pack that belongs to the VOBU containing picture data to be played 10 sec (=20×0.5 sec) after the playback start time of the current VOBU. Thus, the item setting unit 11 waits for a VOBU containing picture data to be played 10 sec after is stored onto the memory 6, and then counts how many NV packs are there between the NV pack that belongs to the current VOBU and the NV pack that belongs to the VOBU containing the picture data. In this manner, the value of FWDI 120 is obtained. Similarly, FWDI 60, FWDI 120, and FWDI 240 are determined after the NV packs of the respective VOBUs containing picture data to be played 30 sec, 60 sec, and 120 sec after are stored onto the memory 6, by counting the numbers of relevant NV packs. This completes the description of the item setting unit 11.

Structure of Control Unit—Part 2—Navigation Generator 12

The navigation generator 12 controls the video encoder 2, the audio encoder 3, the NV pack generating unit 4, and the interleaving unit 5. To carry out the control, the navigation generator 12 defines the navigation structure that is composed of PGC information-Cell information-VOB to be recorded onto the DVD±R, and causes the video encoder 2, the audio encoder 3, the NV pack generating unit 4, and the interleaving unit 5 to encode VOBUs so as to constitute the thus defined navigation structure.

(Improvement on Navigation Structure—Part 1—Limitation on Number of Cell Information Pieces)

Now, a description is given in detail to improvements made on the navigation structure defined by the navigation generator 12. One improvement lies in that the number of pieces of Cell information is limited. Normally, the DVD-Video standard allows a piece of PGC information to contain as many as 255 pieces of Cell information. The upper limit is set for the following reason. A DVD player attempts to sequentially read a main stream such as a VOB sequence from a DVD±R, rather than preloading the main stream into its memory. On the other hand, PGC information is preloaded into the memory and made to resident there, so as not to interfere with reading of the main stream itself. Since the PGC information is to be resident in the memory, it is preferable to limit the number of pieces of Cell information contained per piece of PGC information in order to avoid undesirable possibilities that all the pieces of Cell information constituting the PGC information cannot be loaded into the memory. This is the reason that the number of pieces of Cell information to be contained in one piece PGC information is generally limited. According to the navigation structure generated by the navigation generator 12 of this embodiment, the number of pieces of Cell information to be contained per piece of PGC information is further limited to 253, which is fewer by two than the conventional limit.

(Improvement on Navigation Structure—Part 2—(Length of VOB(Cell))

According to the above navigation structure, PGC information is composed of 253 pieces of Cell information. In addition, one VOB is referenced by one piece of Cell information, the time length of one VOB(Cell) satisfies the following expression.

Average Playback Time of VOB(Cell)≧ Scheduled Recording Time H/253

(Improvement on Navigation Structure—Part 3—Scheduled Recording Time H & Free Capacity)

The numerator "Scheduled Recording Time" in the above expression is obtained by dividing the free capacity of the DVD±R by the bit rate selected by the user through selection of the recording mode. The free capacity of the DVD±R differs depending on whether the DVD±R is a dual layer type as well as whether any data is stored on the DVD±R. A dual layer DVD±R has a capacity of 8.5 GB. If any data is already stored, the free capacity remaining in the DVD±R is calculated by subtracting the size of stored data from 8.5 GB.

On the other hand, a single layer type DVD±R has the storage capacity of 4.7 GB. Thus, the free capacity remaining in the DVD±R is calculated by subtracting the size of stored data from 4.7 GB. As mentioned above, there are four recording modes of XP-EP and average bit rates such as 10 Mbps and 5 Mbps are specifically assigned to the respective recording modes. The navigation generator 12 calculates the free capacity of the DVD±R and divides the free capacity by the bit rate assigned to the currently selected recording mode, thereby obtaining the scheduled recording time H.

In the case where a record presetting is made by a user, the scheduled recording time H is calculated simply by subtracting the scheduled recording start time from the scheduled recording end time.

(Improvement on Navigation Structure—Part 4—Meaning of 255-2)

In the above expression, the value used as the denominator is "253", which is calculated by subtracting "2" from "255". The subtraction of "2" is made in view of the possibility that the number of pieces of Cell information increases due to extra pieces of Cell information generated for handling the following two exceptional cases. Details of the increase in the Cell information pieces will be given later.

Case 1:

In the case where a recording process is stopped, dummy VOBUs need to be inserted. Consequently, a piece of dummy Cell information specifying the thus inserted dummy VOBUs needs to be generated. As a result, the number of pieces of Cell information increases.

Case 2:

In the case where the area of the DVD±R remaining up to a layer boundary is less than the size of VOB to be recorded, the area needs to be filled with dummy VOBUs or dummy data. Consequently, a piece of dummy Cell information specifying the dummy VOBUs need to be generated. As a result, the number of pieces of Cell information increases.

The above calculation aims to minimize the time length of VOB by maximizing the number of pieces of Cell information. The time length of VOB may also be minimized by dividing continuously recorded data into two pieces of PGC information. Yet, PGC information is a unit that a DVD player recognizes as one "recorded program" at the time of playback of the DVD±R. It is not preferable to determine a section of recorded data to be handled as one recorded program, merely in order to minimize the time length of VOB, which is beneficial only to device operation. For this reason, the navigation generator 12 performs such control, so that each piece of PGC information to be recorded onto the DVD±R is composed of 253 pieces of Cell information.

(Improvement on Navigation Structure—Part 5—Example Calculation of Time Length of VOBU(Cell))

FIG. 6 is a table showing, for each of a plurality of values 2, 4, 6, 8, 10, 12, 14, and 16 that the scheduled recording time H may take, the values of "Average Playback Time per Cell", "Maximum Playback Time per Cell", "Largest FWDI" which is the largest FWDI to be set, "Hold Time of Memory 6 needed for Setting Largest FWDI", "Average Recording Rate", and "Maximum Recording Rate" in the case where the memory 6 has 32 MB capacity.

The values shown in the table relate to the case where multiple VOBs are consecutively recorded onto a dual layer DVD-R (8.5 GB) so as to be referenced by a single piece of PGC information.

The "Average Playback Time per Cell" is the value calculated by Scheduled Recording Time H/253. Thus, if the scheduled recording time H is two hours, the average playback time per cell must be at least 28.4 sec. If the scheduled recording time is four hours, the average playback time per cell must be at least 56.9 sec.

The "Maximum Playback Time per Cell" holds the maximum value for effectively reducing the amount of memory required for FWDI setting. Naturally, the value held thereby exceeds the average playback time shown in the table in the next column to the left. The maximum playback time per cell is determined depending on the largest FWDI shown in the next column to the right.

The "Largest FWDI" indicates the largest one of the FWDIs to be set in compliance with the DVD-Video standard within one Cell of which playback time is the maximum. Since the time length of one VOB is determined through the above calculation, it is no longer necessary to set FWDIs not previous to the point in time indicated by VOB_V_E_PTM. Thus, the FWDI closest, without exceeding, to the point indicated by VOB_V_E_PTM is the largest FWDI. If the playback time of VOB(Cell) is less than 30 sec, the only FWDI to be set is FWDI 20 indicating the address of VOBU that is ten sec ahead. The rest of FWDIs 60, 120, and 240 can be set to an invalid value. Consequently, if the memory 6 is capable of holding ten seconds of data, the FWDI is set without violating the DVD-Video standard.

The following describes the reason why it is not necessary to set any FWDIs falling on or after the point indicated by VOB_V_E_PTM. The recording device refers to FWDIs for performing high-speed playback. The high-speed playback is applicable only within a single Cell. More specifically, the DVD-Video standard normally makes it possible to play a Cell in a playback sequence arbitrarily defined in PGC information. With this being the situation, the Cell to be played next may not be physically located next to the current Cell on the DVD±R, so that the high-speed playback is applicable only within a single Cell. As above, the range within which the high-speed playback is possible is limited to one Cell. Thus, if FWDI 240 corresponds to a point in time indicated by VOB_V_E_PTM (playback end time of the Cell, to be more precise) or after, the FWDI 240 is allowed to be set to an invalid value in advance.

The "Hold Time of Memory needed for Setting Largest FWDI" indicates a time period during which the memory 6 needs to hold encoded VOBUs before the largest FWDI is set. If FWDI 20 is the largest FWDI, the hold time is 10 sec. If FWDI 60 is the largest FWDI, the hold time is 30 sec. If FWDI 120 is the largest FWDI, the hold time is 60 sec.

The "Average Recording Rate" indicates the average bit rate at which VOBUs are recorded on to the DVD±R. If the scheduled recording time H is two hours, the average recording rate is 9.44 Mbps. Similarly, if the scheduled recording time H is four hours, the average recording rate is 4.72 Mbps. If the scheduled recording time H is six hours, the average recording rate is 3.15 Mbps.

Figure 7:
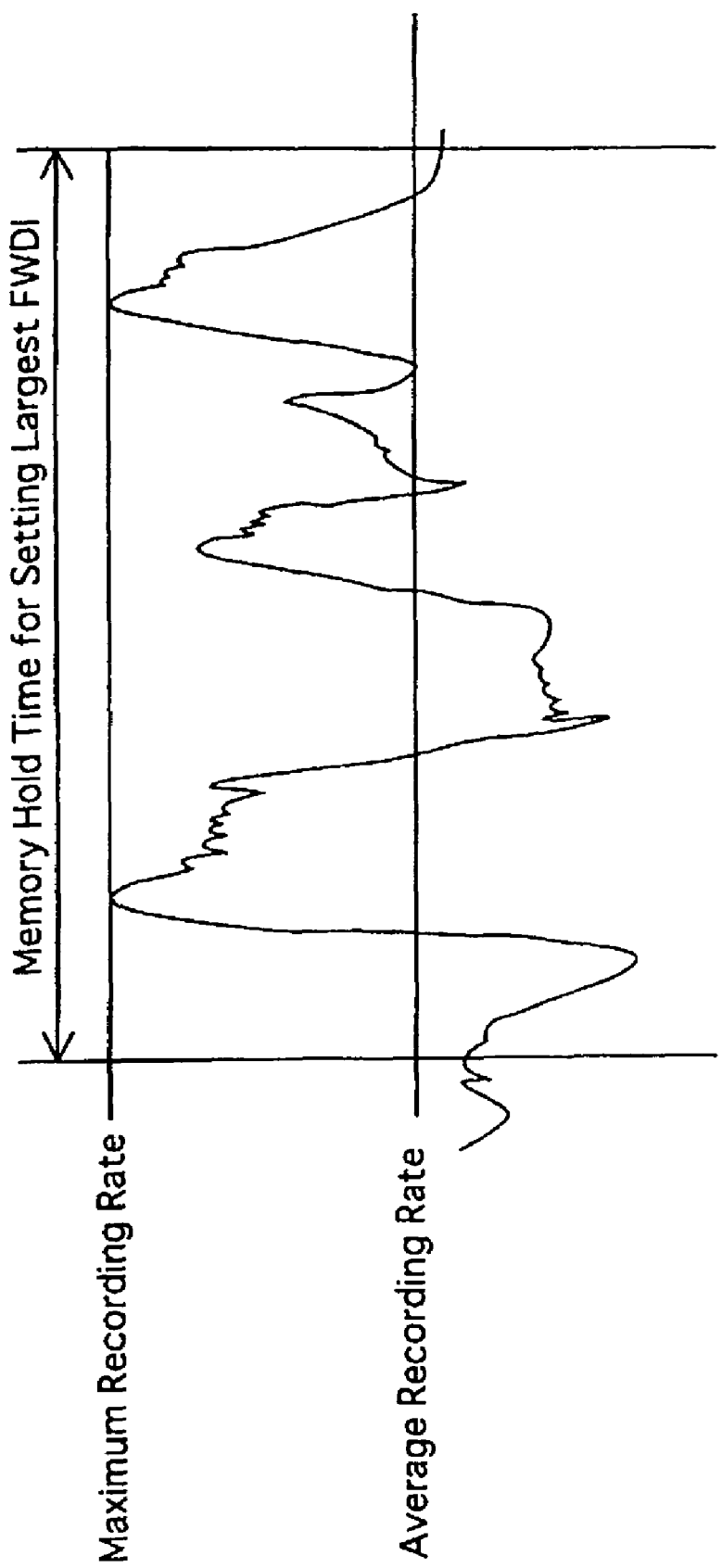
FIG. 7 is a view showing the relation between the average and maximum recording rates.

The "Maximum Recording Rate" is obtained by dividing 32 MB, which is the capacity of the memory 6, by the hold time. If the scheduled recording time H is two hours, the maximum recording rate is 26.8 Mbps (=32 MB/10 sec). Similarly, if the scheduled recording time H is four hours, the maximum recording rate is 8.95 Mbps (=32 MB/30 sec). If the scheduled recording time H is six hours, the maximum recording rate is 4.47 Mbps (=32 MB/60 sec). That is, when the memory 6 has 32 MB capacity, all the maximum recording rates exceed the respective average recording rates. Thus, VOBUs maybe encoded at variable bit rates up to the maximum recording rates. FIG. 7 shows the relation between the average and maximum recording rates.

Through the calculation shown in FIG. 6, it is determined, depending on the playback time of the Cell, which FWDIs need to be determined for the VOBUs held on the memory 6 to be ready to be recorded. Accordingly, the minimum hold time of one VOBU on the memory 6 is determined, and the average and maximum recording rates are calculated.

Suppose, for example, the recording mode is set for eight hours of recording and the maximum number of Cells is to be recorded. In this case, the average playback time per Cell is calculated to be 114 sec by dividing eight hours by 213, which is the maximum number of pieces of Cell information. That is to say, by generating Cells each of which is at least 114 sec, eight hours of data is dully recorded. That means, when the scheduled recording time H is 2 to 8 hours, it is sufficient to set FWDI 240 to an invalid value and thus it is not necessary to wait for the address of data 120 sec ahead to be determined. Consequently, when the memory 6 holds 60 seconds of data, FWDI 120 of the NV pack that belongs to the oldest one of the VOBU held on the memory 6 is duly set and thus this oldest VOBU is ready to be recorded onto the write-once recording medium (DVD±R).

On the other hand, when the scheduled recording time H is 10 to 16 hours, the playback time per Cell exceeds 120 sec. In this case, FWDI 240 needs to be set and thus the memory 6 needs to hold at least 120 sec of data.

(Improvement on Navigation Structure—Part 6—Setting VOB_V E_PTM and FWDI)

Figure 8:
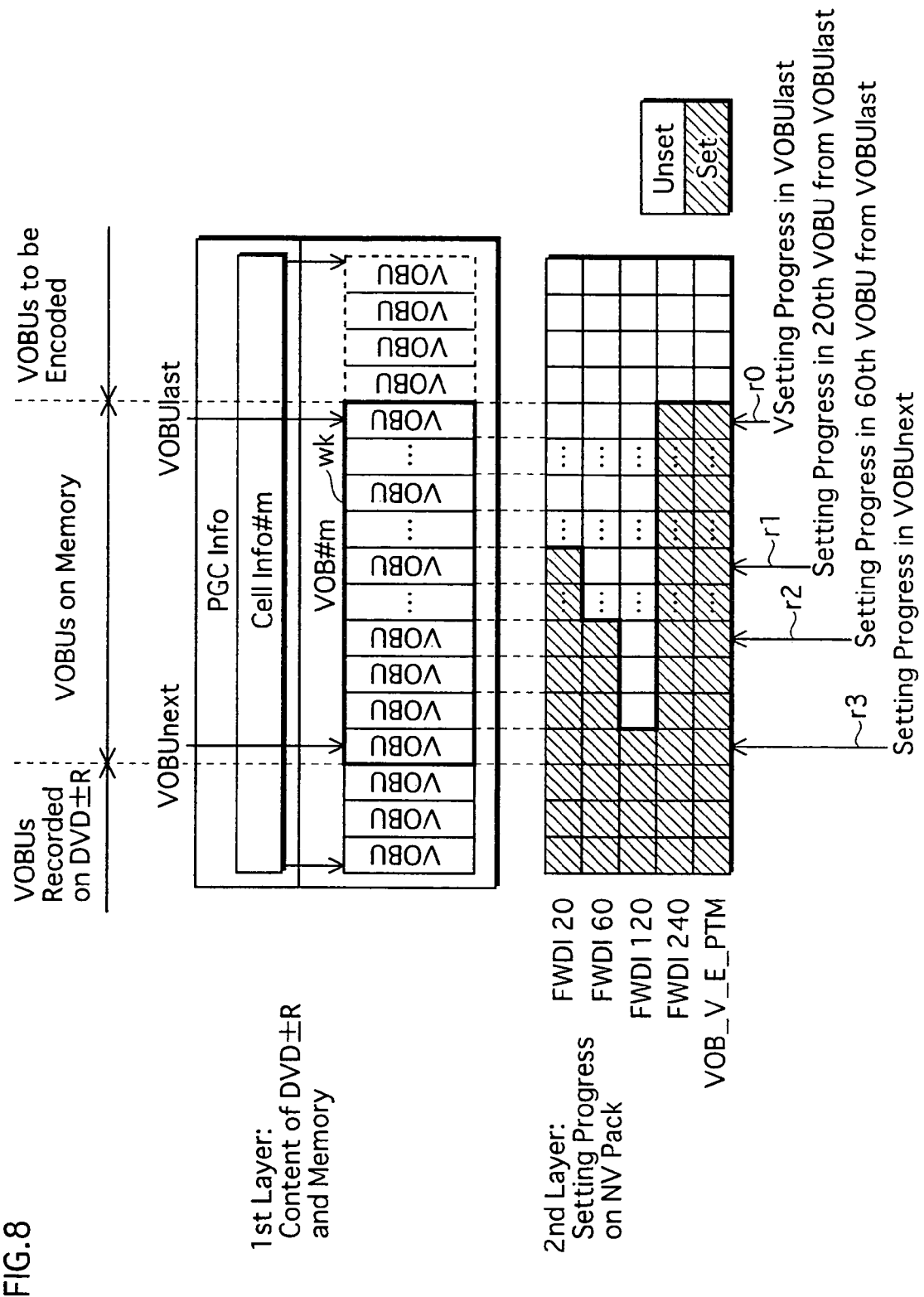
FIG. 8 is a view showing which VOBUs need to be held in the memory when recording VOBUs onto a DVD±R.

FIG. 8 shows which VOBUs need to be held in the memory 6 when recording VOBUs onto the DVD±R. In the figure, the "VOBUlast" shown on the first level is the most recently encoded VOBU, and the "VOBUnext" is the VOBU to be recorded next onto the DVD±R. A box wk1 enclosing the VOBUs from the VOBUlast to the VOBUnext represents the sequence of VOBUs held in the memory 6.

The second level in the figure shows the data items of the NV packs contained in the respective VOBU. In the figure, the data items represented by the squares are vertically aligned with a corresponding one of VOBUs shown on the upper level, and horizontally aligned with names of the data items of the NV pack, scuh as FWDI 20, FWDI 60, FWDI 120, FWDI 240, and VOB_V_E_PTM.

Furthermore, a white square indicates that the data item is not set yet, whereas a shaded square indicates that the data item is already set. By visually represented by the white and shaded squares, all the data items are set for the VOBUnext and the preceding VOBUs. On the other hand, some of the data items remain unset for the VOBUs subsequent to the VOBUnext.

With reference to the lines of square pointed by an arrow r0 in the figure, it is shown that among the data items relating to the VOBUlast, FWDI 20, FWDI 60, and FWDI 120 are unset, whereas FWDI 240 and VOB_V_E_PTM are already set. As described above, since VOB_V_E_PTM is calculated by adding the time length VOB to VOB_V_S_PTM, VOB_V_E_PTM is determined once VOB_V_S_PTM is determined.

When one VOB is equal to one Cell, VOB_V_E_PTM of every VOBU is uniformly calculated by adding the time length of Cell to VOB_V_S_PTM. Thus, VOB_V_E_PTM is already set for every VOBU. Moreover, FWDI240 indicates the address of VOBU on or after a point indicated by VOB_V_E_PTM. (To be more precise, at a point of Cell Playback End time. Yet, the description is given on condition that "1 VOBU=1 Cell".) Thus, the FWDI 240 is already set for every VOBU.

Reference is now made to the lines of square pointed by an arrow r1 in the figure. This line of squares represents data items contained in the NV pack of the 20$^{th}$ VOBU previous to the VOBUlast. For this VOBU, FWDI 60 and FWDI 120 are unset, but FWDI 20 and VOB_V_E_PTM are already set. The FWDI 20 is already set because the VOBUlast, which is the 20th VOBU subsequent to that VOBU, has been encoded, so that the number of packs present between those two VOBUs is fixed.

Reference is now made to the lines of square pointed by an arrow r2 in the figure. This line of squares represents data items contained in the NV pack of the 60th VOBU previous to the VOBUlast. For this VOBU, FWDI 120 is unset, but FWDI 20, FWDI 60, FWDI 240, and VOB_V_E_PTM are already set. The FWDI 60 is already set because the VOBUlast, which is the 60th VOBU subsequent to that VOBU has been encoded, so that the number of packs present between those two VOBUs is fixed.

Reference is now made to the lines of square pointed by an arrow r3 in the figure. This line of squares represents data items contained in the NV pack of the VOBUnext, which is the 120th VOBU previous to the VOBUlast. For the VOBUnext, FWDI 20, FWDI 60, FWDI 120, FWDI 240, and VOB_V_E_PTM are already set. The FWDI 120 is already set because the VOBUlast, which is the 120th VOBU subsequent to the VOBUnext, has been encoded, so that the number of packs present between the VOBUnext and the VOBUlast is fixed. Since all the data items of the NV pack are determined, the VOBUnext is ready to be recorded onto the DVD±R.

As described above, VOBUs are sequentially recorded onto the DVD±R as soon as FWDI 20, FWDI 60, FWDI 120 for the respective VOBUs are determined and thus all the data items of the respective NV packs are determined.

As described above, in the case of the recording mode set for eight hours of recording, the largest FWDI to be set is FWDI 120. Thus, the memory 6 needs to hold the minimum numbers of VOBUs (equivalent to 60 sec) for setting FWDI 120. This concludes the description of the item setting unit 11 and the navigation generator 12.

Structure of Control Unit—Part 3—VOBU Recording Controller 13

The VOB recording controller 13 controls the drive device 1 to record VOBs. The control is carried out by sequentially causing VOBUs to be transferred from the memory 6 to the drive device 1 as soon as all the data items in the respective NV packs are determined, and by instructing the drive device 1 to sequentially record the transferred VOBUs. The control by the VOB recording controller 13 continues until the current point reaches a point indicated by VOB_V_E_PTM. That is to say, even if a recording stop operation is made before the point of VOB_V_E_PTM is reached, the control of VOB recording continues.

Structure of Control Unit—Part 4—Dummy Generator 14

The dummy generator 14 generates dummy VOBUs and dummy Cell information referencing the dummy VOBUs. As described above, VOBUs are recorded onto the write-once recording medium so as to maintain the relation where 1 VOB=1 Cell. Yet, the dummy generator 14 generate dummy Cell information, so that dummy VOBUs are recorded in the relation where 1 VOB≧2 Cells. Dummy Cell information is not contained in PGC information and thus not used in playback presented for users. Dummy Cell information is inserted for ensuring integrity with the value of VOB_E_S_PTM in the case where user makes a recording stop operation.

(Recording Stop)

The recording stop mentioned herein is caused during the recording in response to a user operation or upon finding that content to be recorded is copyrighted. Even if the recording is made to stop, the values of VOBUs already recorded to the DVD±R by that time cannot be modified regardless of the fact that those values were set based on the playback end time (VOB_V_E_PTM) of the VOB.

In the case where VOBUs having been encoded by the time of the recording stop are not yet recorded onto the recording medium, i.e. all the VOBUs contained in the VOB currently being encoded are still held on the memory 6, each NV pack can be rewritten to update the value of VOB_V_E_PTM. In this way, the request for recording stop is appropriately dealt with. Yet, if the first part of the VOB has been already recorded onto the write-once recording medium, it is no longer possible to rewrite the value of VOB_V_E_PTM.

With this being the situation, the dummy generator 14 fills, with dummy VOBUs, the remaining part of the VOB between the recording stop point and the point corresponding to VOB_V_E_PTM. Now, with reference to FIGS. 10 and 11, a description is given to the processing performed when the recording as illustrated in FIG. 9 is made to stop.

Figure 9:
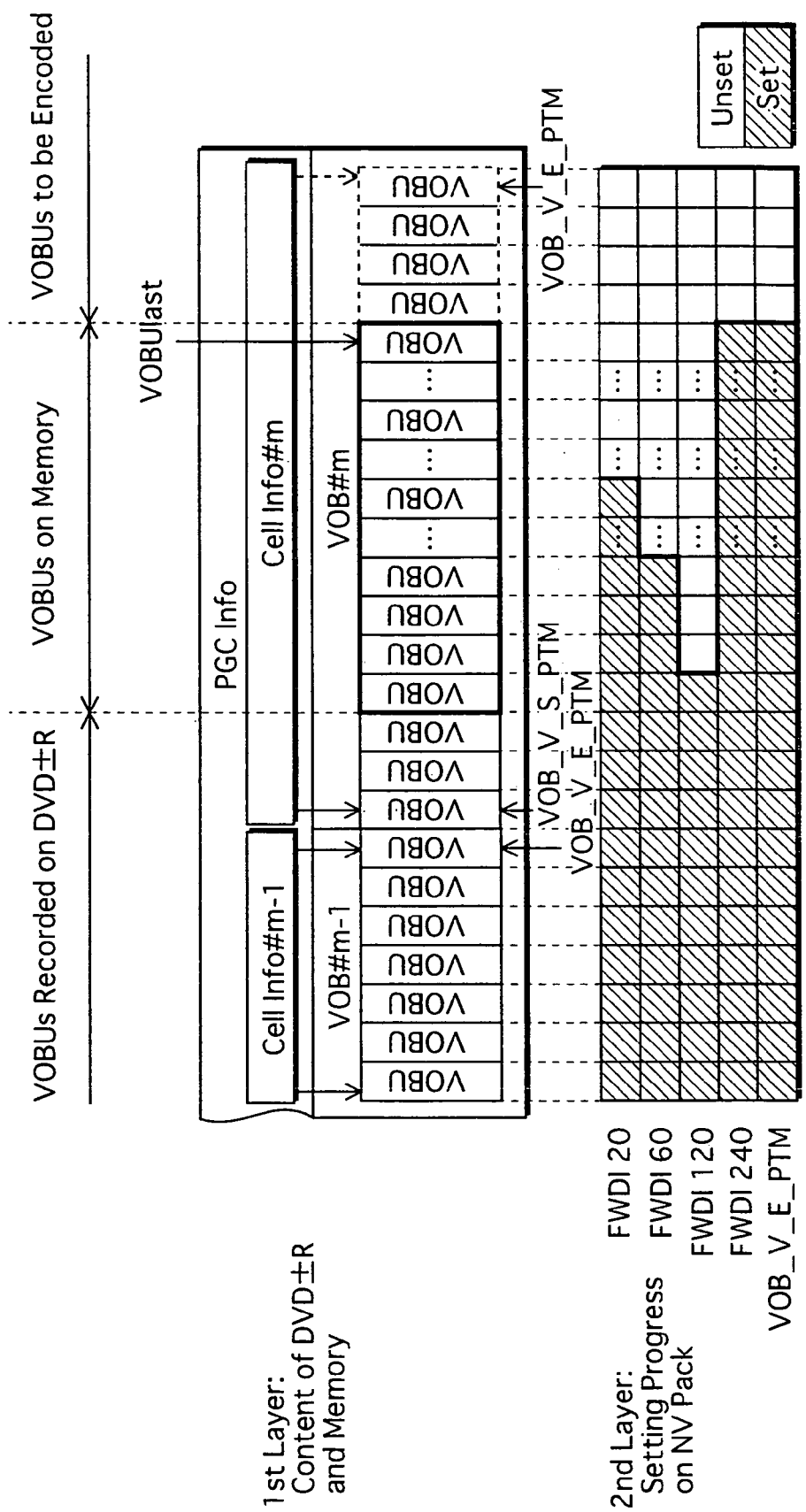
FIG. 9 is a view showing the processing performed by a dummy generator 14 in response to a recording stop.
Figure 10:
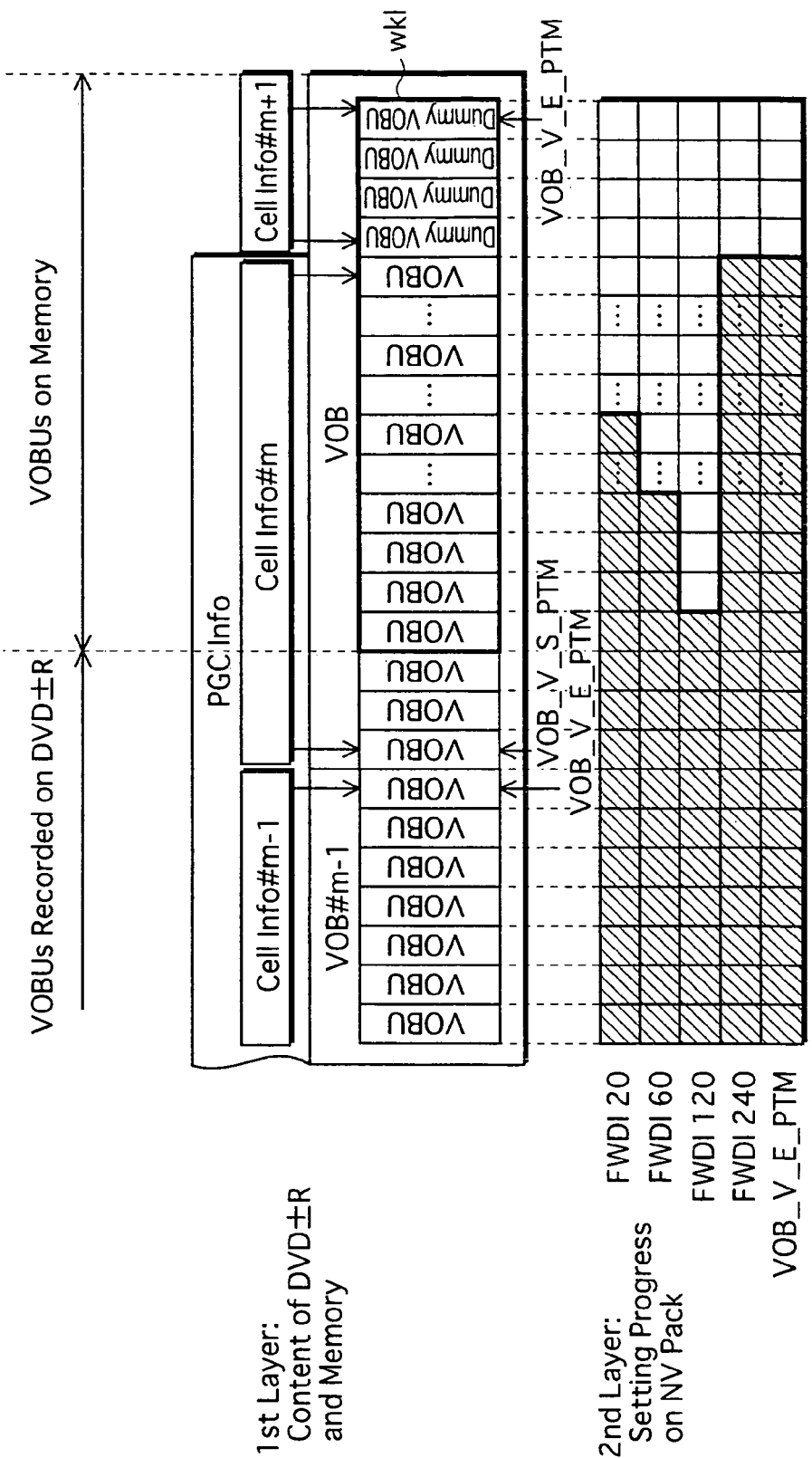
FIG. 10 is a view showing the processing performed by the dummy generator 14 in response to the recording stop.
Figure 11:
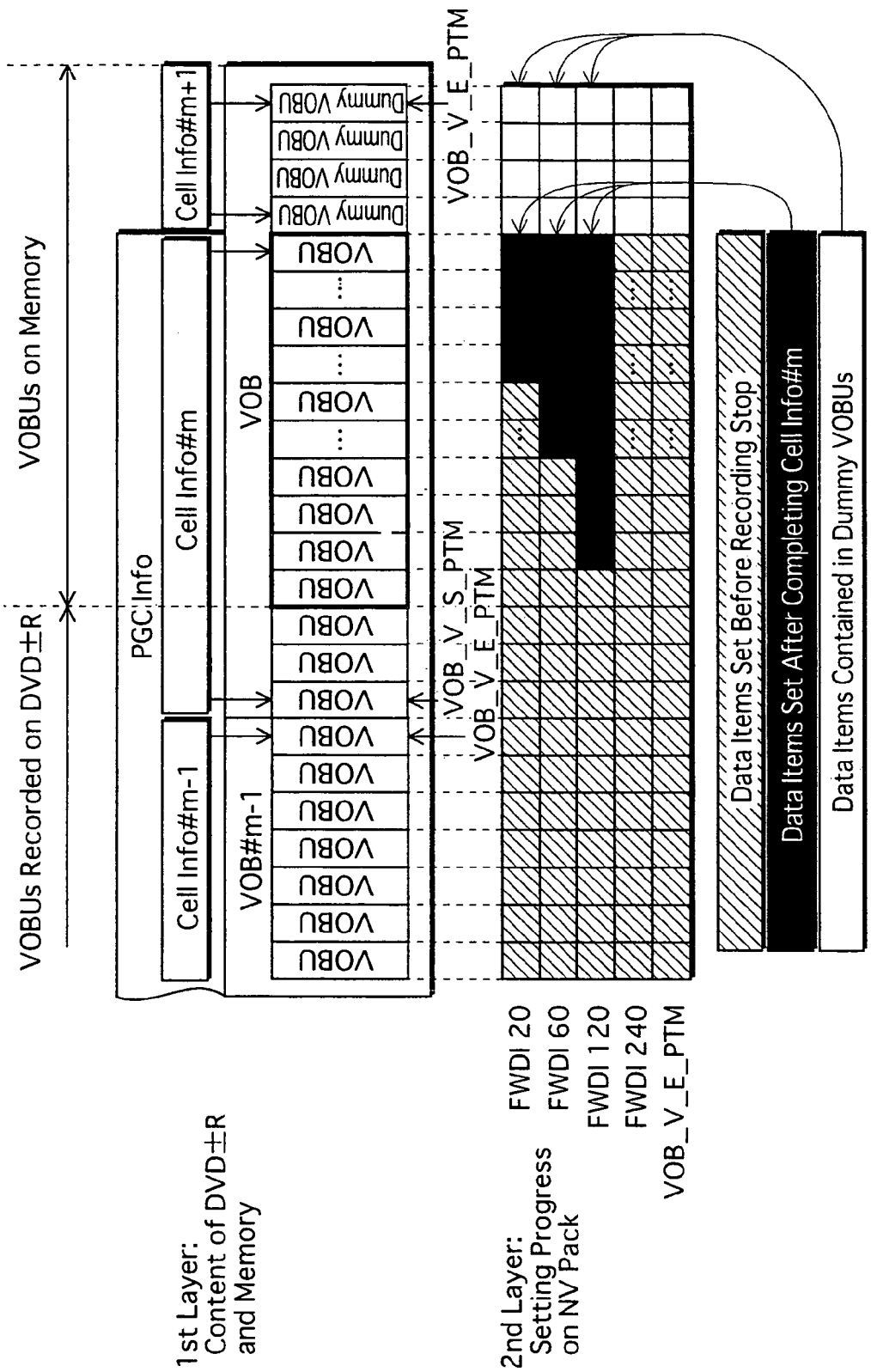
FIG. 11 is a view showing the state where FWDI 20, FWDI 60, FWDI 120 are determined as a result that dummy VOBUs are inserted.

FIG. 9 shows the state where the VOBUlast has just been encoded. If a recording stop operation is received at this point of time, Cell information #m, dummy VOBUs, and Cell information #m+1 are generated as shown in FIG. 10.

The "Cell information #m" specifies, as one playback section, a sequence of VOBUs starting from the one located at the point of VOB_V_S_PTM and up to VOBUlast.

The "dummy VOBUs" are used to fill a part of the VOB between the recording stop point and the point of VOB_V_E_PTM.

The "Cell information #m+1" specifies, as one playback section, the sequence of dummy VOBUs located between the recording stop point and the point of VOB_V_E_PTM. Since Cell information #m and Cell information #m+1 are now determined, FWDI 20, FWDI 60, and FWDI 120 for every VOBU held on the memory 6 can be all determined.

In the state shown in FIG. 9, FWDI 20, FWDI 60, FWDI 120 for some of the VOBUs held on the memory 6 are not yet determined. In the state shown in FIG. 11, FWDIs of all NV packs contained in the Cell information #m are all set because Cell information #m is determined. Moreover, since Cell information #m+1 is also determined, FWDIs of each dummy VOBU are easily and appropriately set by fixing the size of dummy VOBU. The VOB_V_E_PTM of the Cell information #m+1 is set to the same value as the VOB_V_E_PTM of the Cell information #m because the respective pieces of Cell information belong to the same VOB.

As described above, when the VOBU encoding is made to stop in response to a recording stop request, the dummy generator 14 fills with dummy VOBUs the part of the VOB between the VOBU last, which is the most recently encoded VOBU at that time, and the point of VOB_V_E_PTM.

In addition, the Cell information #m is made to specify the sequence of VOBUs up to the VOBUlast as one playback section, whereas the Cell information #m+1 is made to specify the sequence of dummy VOBUs as another playback section. As a result, all the FWDIs are determined for all the VOBUs. Finally, the VOBUs, dummy VOBUs, Cell information #m, and Cell information #m+1 are recorded onto the DVD±R along with PGC information containing the stream up to the Cell information #m.

Since the Cell information #m+1 which is dummy information located at the end of the stream is excluded from the PGC information. Rather, the PGC information contains the stream up to the Cell information #m. With this arrangement, when a user plays back the PGC information, data located beyond the recording stop point (Cell Information #m+1) is never played back.

(Recording in Vicinity of Layer Boundary)

When the current recording point on the DVD±R is close to a layer boundary, the dummy generator 14 inserts dummy Cell information provided that the free capacity remaining in the current layer (L0 layer) is smaller than a predetermined size. This size may be calculated by Cell Length×Maximum Recording Rate or by Cell Length×Average Recording Rate. When the free capacity remaining in the current layer is smaller than the predetermine size, the dummy generator 14 generates one or more dummy VOBUs and dummy Cell information specifying the dummy VOBUs, and fill the remaining part of the current layer with the dummy VOBUs and the dummy Cell information. With this arrangement, recording of a new VOB and Cell information can started from the top of the next recording layer (L1 layer).

Figure 12:
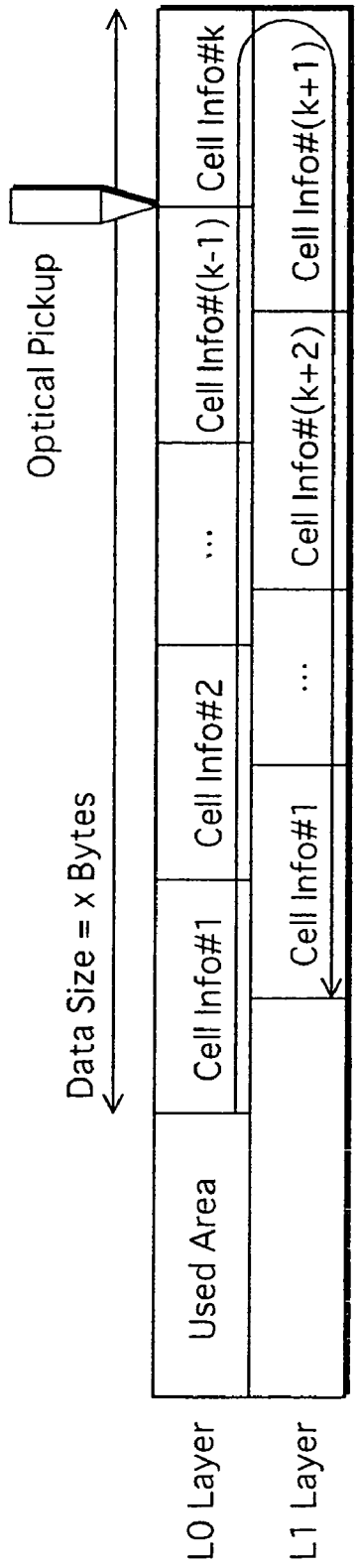
FIG. 12 is a view schematically showing the processing performed in an area of the DVD±R close to a layer boundary.

FIG. 12 schematically shows the processing performed when data is recorded in a vicinity of a layer boundary. As shown in the figure, the free capacity remaining in the layer L0 is detected at the time when recording of Cell information #k−1 is completed (at a point where an optical pickup is located in the figure). If the detected free capacity is smaller than the predetermined size, the dummy generator 14 generates and records dummy VOBUs to fill the remaining area of the layer L0. The dummy generator 14 then generates dummy Cell information that specifies the thus generated sequence of dummy VOBUs as one playback section.

Now, a description is given to dummy VOBUs. FIGS. 13A-13G show examples of the data structures of dummy VOBUs. It is naturally appreciated that the data structures may be applicable to dummy VOBUs generated in response to a recording stop operation made by a user.

As shown in the figure, the first one of dummy VOBUs specified as one playback section by dummy Cell information needs to contain at least one piece of picture data. Therefore, the first VOBU may contain data of a meaningless picture, such as a black or blue picture. Alternatively, the first VOBU may contain duplicate of picture data stored near the recording stop point, such as picture data contained in GOP at the time of recording stop or picture data recorded after the recording stop, subsequent to Cell information #1. Regarding audio data, the first VOBU may contain audio data representing digital "0" (silence) or may contain no audio data.

The second and subsequent dummy VOBUs out of the sequence of dummy VOBUs specified as one playback section dummy by the Cell information may be identical in structure to the first dummy VOBU. Alternatively, such a dummy VOBU may only contain: audio data representing digital "0" (silence) alone; a NV pack and an integral number of provider-defined packs; or a NV pack alone.

Regardless of whether it is located at the top of the dummy VOBU sequence, if any dummy VOBU is shorter than 0.4 sec which is the minimum time length of VOBU, a sequence end code is attached and the NV pack of that VOBU may be modified to indicate the video playback time of at least 0.4 sec. With this arrangement, at the time of playback, the sequence end code causes the decoder to freeze. That is to say, even if a VOBU contains video frame data of one picture, the picture may be ended with a sequence end code, so that the playback time of the VOBU is virtually extended.

Therefore, in order to generate dummy VOBUs with a minimum data size, the structures shown in FIGS. 13C and 13D are most preferable for the first one of the dummy VOBUs specified by Cell information #m+1, and the structure shown in FIG. 13G is most preferable for the following VOBUs. The structure shown in FIG. 13F is useful in that the data size is freely adjustable.

Structure of Control Unit—Part 5—PGC Information Recording Controller 15

The PGC information recording controller 15 controls the drive device 1 to record, onto the DVD±R, PGC information that is generated on the navigation memory 9 by the navigation generator 12, after completion of the VOB recording control by the VOB recording controller 13. The control by the PGC information recording controller 15 is carried out by transferring PGC information to the drive device 1 and instructing the drive device 1 to record the transferred PGC information.

Now, with reference to flowcharts, a description is given to processing steps performed by the control unit 10 having the above-described structure.

Figure 14:
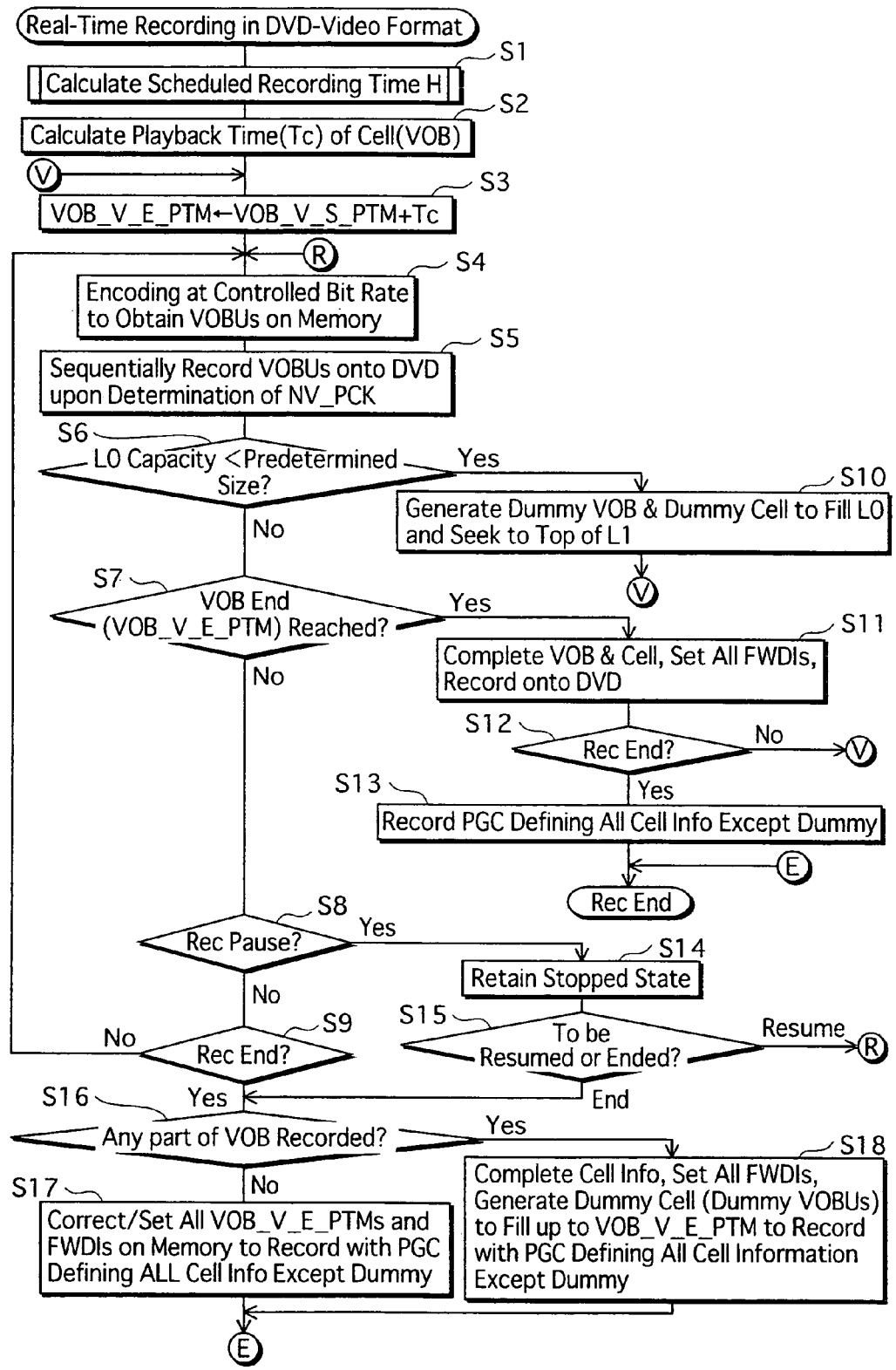
FIG. 14 is a flowchart of the processing steps performed by the control unit 10.

FIG. 14 is a flowchart of the processing steps performed by the control unit 10. As shown in the flowchart, the control unit 10 calculates the scheduled recording time H (step S1) Next, the control unit 10 divides the calculated scheduled recording time H by the value "253" to determine the largest FWDI to be set and calculates the maximum playback time of Cell information. The control unit 10 then sets the playback time Tc of the Cell information to the value not greater than the calculated maximum playback time and not smaller than the value of the scheduled recording time H/253 (Step S2). The control unit 10 next adds the value of Tc to the value of VOB_V_S_PTM to calculate the value of VOB_V_E_PTM (step S3). Subsequently, the loop composed of steps S4-S9 is performed.

In the case of the DVD±R (8.5 GB) having no data recorded thereon, the value of Tc is preferably not smaller than the "Average Playback Time per Cell" and not greater than the "Maximum Playback Time per Cell" both of which are shown in FIG. 6 relatively to each scheduled recording time H. It is also preferable that the value of Tc is an integral multiple of the playback time of one vide picture.

Figure 15:
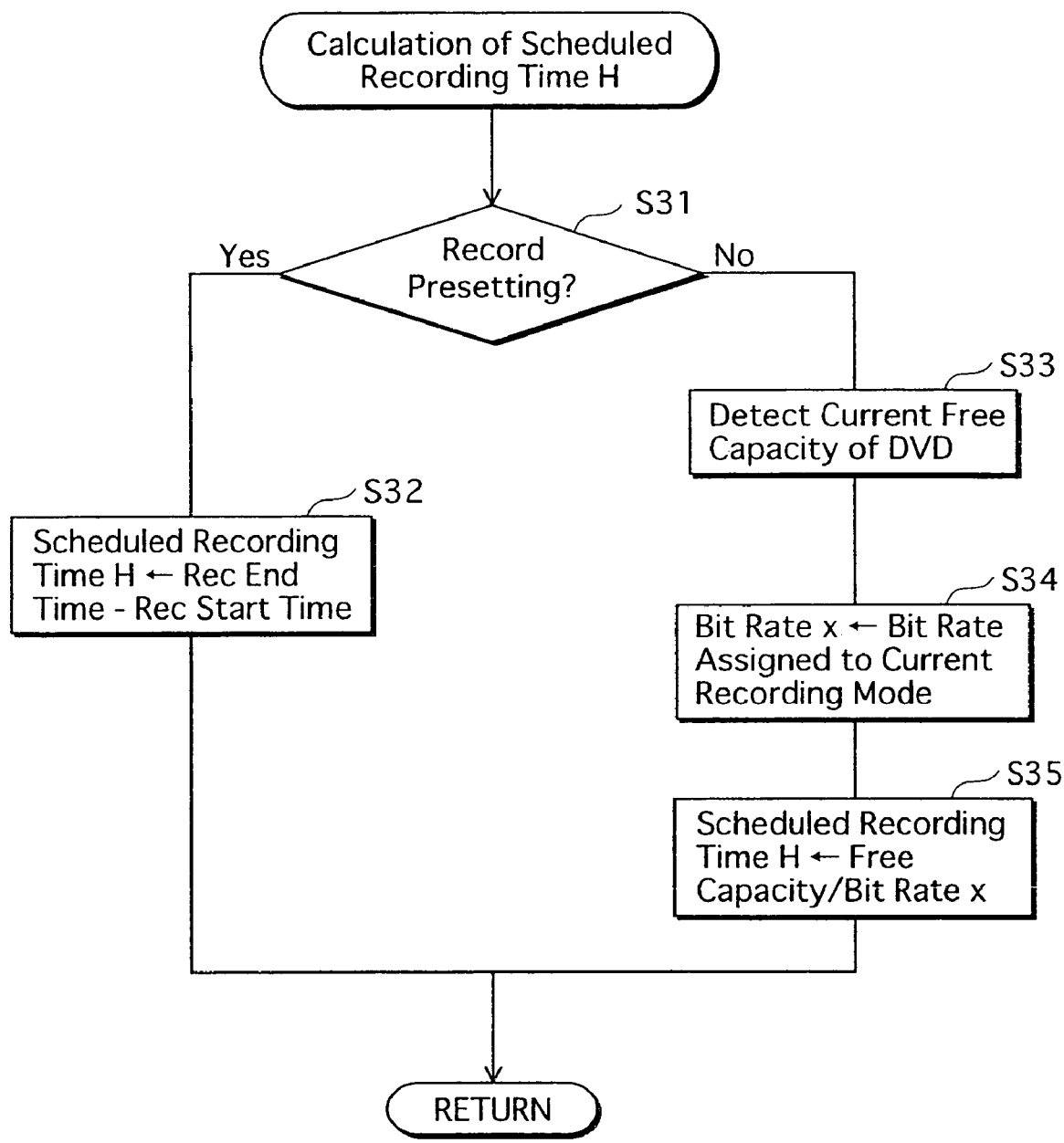
FIG. 15 is a flowchart of the processing steps for calculating the scheduled recording time H.

FIG. 15 is a flowchart of the processing steps for calculating the scheduled recording time H. As shown in the flowchart, first, it is judged whether any recording schedule is preprogrammed by a user (step S31). If it is judged that a recording schedule is preprogrammed (step S31: YES), the scheduled recording time H is calculated by subtracting the scheduled recording start time from the scheduled recording end time (step S32).

On the other hand, if no recording schedule is preprogrammed (step S31: NO), the free capacity currently remaining in the DVD±R is detected (step S33). Then, the average bit rate assigned to the currently selected recording mode is designated as the bit rate x (step S34), and the free capacity is divided by the bit rate x to calculate the scheduled recording time H (step S35).

By dividing the scheduled recording time H by "253", the lower limit of the average playback time per VOB (Cell) is calculated. In addition, the maximum playback time per Cell is calculated in the step S2, depending on the largest FWDI as shown in FIG. 6.

In the loop composed of the steps S4-S9, VOBUs are generated on the memory 6 by encoding the video and audio input at an appropriately controlled variable bit rate (step S4), the thus obtained VOBUs are recorded onto the DVD±R sequentially upon completion of the respective NV packs (step S5), and judgments are made in the steps S6-S9 to see whether the respective conditions result in "YES".

In the step S6, it is judged whether the free capacity remaining in the current layer (L0 recording layer) is smaller than the predetermined size. This judgment is made because the DVD-Video format does not allow Cell information to straddle a layer boundary.

The predetermined size is calculated for example by: Maximum Length per Piece of Cell information×Maximum Recording Rate. In the case where the free capacity remaining in the first layer is smaller than the predetermined size, dummy VOBUs and dummy Cell information (Cell information #k) are generated to fill out the free capacity of the current layer. Data recording is then restarted from the top of the next layer (L1 recording layer) (step S10).

(When Reaching VOB_V_E_PTM)

In the step S7, it is judged whether the current recording point has reached the point of VOB_V_E_PTM. If YES, all the VOBUs and Cell information currently on the memory 6 are completed and all the FWDIs are determined, so that the VOBUs are recorded onto the DVD±R (step S11).

In the step S12, it is judged whether the VOB_V_E_PTM equally means the end of recording. If YES, the PGC information containing all the pieces of Cell information except dummy Cell information is recorded on to the DVD±R (step S13). If NO, on the other hand, a new VOB is started to be generated and the processing goes back to the step S3.

(Processing in response to Recording Pause)

In the step S8, it is judged whether the recording is to be paused in response, for example, to a user instruction or detection of copyrighted content. If it is judged YES, the recording device comes to temporarily stop the recording while maintaining the state as it is (step S14).

In the step S15, it is judged whether to resume or end the recording. When it is judged to end the recording, the step S16 is performed. On the other hand, if it is judged to resume the recording, the step S4 is performed. The recording is resumed in the case where the user releases the recording pause or copyright free content is newly input.

(Processing for Recording End)

In the step S9, it is judged whether to end the recording in response to a user instruction or upon detection of copyrighted content. If it is judged YES, it is further judged in the step S16 whether any part of the currently encoded VOB has been already recorded onto the DVD±R.

If it is judged that the VOB has not been recorded on the DVD±R yet, the Cell information held on the memory 6 is completed, and the VOB_V_E_PTM and all the FWDIs of each NV pack are either set or corrected. Then, the VOB is recorded onto the DVD±R together with PGC information specifying all the pieces of Cell information except dummy Cell information (step S17).

On the other hand, if it is judged that any part of the VOB has been recorded, the Cell information held on the memory 6 is completed and all the FWDIs contained in the Cell information are set; dummy VOBUs are inserted to fill all the way to the point of VOB_V_E_PTM; PGC information is generated to specify all the pieces of Cell information, except dummy Cell information specifying the dummy VOBUs; and the VOB is then recorded onto the DVD±R together with the thus generated PGC information (step S18).

According to the above-described embodiment, the length of one VOB is determined with reference to the scheduled recording time H. Once the time length of VOB is determined, there are only limited data items required to be set. It is not necessary to wait for VOBUs located at the end of the VOB length or further to be encoded. That is to say, by limiting the time length of VOB, it is no longer necessary to set data items referencing VOBUs located far from the current VOBU. Consequently, the number of VOBUs that needs to be held on the memory is reduced.

It is therefore possible to minimize the scale of memory required to hold VOBUs until relevant data items are determined, so that the cost of recording devices can be readily reduced. As a consequence, recording devices capable of real-time recording can be produced at a low cost and brought into use in a numerous households.

Supplemental Note

It should be noted that the present invention is not limited to the foregoing embodiment. The present invention may be practiced by other embodiments including (A), (B), and (C) below. Each invention recited in the appended claims is broadened or generalized descriptions of the above-described embodiment and their modifications. The extent of the broadening and generalization reflects the state of the art in the related technical field at the time of filing of the present application.

(A) According to the above description, data is recorded directly onto a write-once recording medium in the DVD-Video format. Yet, the present invention is not limited thereto, and the recording medium may be are writable recording medium. Even in the case where VOBUs are recorded onto a rewritable recording medium, it still places a significant burden on the recording device to rewrite the FWDIs and VOB_V_E_PTM contained in the VOB. With the processing described in the above embodiment, such a burden can be reduced, which is technically significant. Moreover, the recording medium to be used is not limited to any specific type. For example, the recording medium may be an optical disk, a hard disk device, or a semiconductor memory. The processing from encoding to buffering may be carried out by an encoder provided with a buffer, by the control unit 10, or by a single-chip LSI.

(B) In the above embodiment, real-time recording is carried out by way of self-encoding where input digital data is encoded by the recording device itself. Yet, the present invention is also applicable to a device for recording data real-time by way of outside encoding. According to outside encoding, digital data is encoded outside the recording device and thus recording device records the encoded data as it is, without encoding the data by the device itself.

(C) Information processing according to the programs shown in the flowcharts is actually realized using hardware resources. That is to say, the programs of which processing steps are shown in the flowcharts independently are inventions. The above embodiment describes the case where the programs are incorporated in the recording device, but the programs can be used separately from the recording device. Acts of practicing the programs include (1) an act of manufacturing, (2) an act of assigning with or without charge, (3) an act of leasing, (4) an act of importing, (5) an act of providing to the public via a bi-directional electronic communications network, and (6) an act of offering for assignment or lease using storefront displays, catalogs, or brochures.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording device for recording a digital stream onto a recording medium after determining a playback time length of the digital stream to be recorded, comprising:

a first control unit operable to record the digital stream onto the recording medium for the determined playback time length, even if a user makes a stop operation before the determined playback time length is reached;

a generating unit operable to generate playback section information specifying, as a playback section, a part of the digital stream recorded up to a point at which the stop operation is made; and a second control unit operable to record playback path information containing the playback section information onto the recording medium, wherein the playback time length is determined using the following equation:

$$\text{the playback time length} \geq \text{time } H/\alpha,$$

where the time H is calculated (i) by dividing a free capacity currently remaining in the recording medium by a bit rate set by the user for the recording device, or (ii) by depending on a record presetting made by the user, and $\alpha$ is a number of two or more pieces of playback section information that the generating unit is operable to generate.

2. The recording device according to claim 1, wherein the number of pieces of playback section information that the generating unit is operable to generate is determined based on a number of pieces of playback section information generated for exception handling, the exception handling includes:

a first process performed when a stop operation is made before the determined time length is reached; and a second process performed when a layer boundary exists in an area of the recording medium into which the digital stream is to be recorded, and the pieces of playback section information generated for exception handling includes:

first dummy playback section information specifying, as a dummy playback section, a remaining part of the digital stream subsequent to the recording stop point, and second dummy playback section information specifying, as a dummy playback section, a part of the area extending to the layer boundary.

3. The recording device according to claim 1, wherein the number of pieces of playback section information that the generating unit is operable to generate is determined by using the following equation:

$$n-m,$$

where n is a maximum number of pieces of playback section information contained per piece of playback path information, and m is a number of pieces of playback section information generated for exception handling.

4. A recording device for recording a video object onto a recording medium after determining a playback time length of the video object to be recorded, comprising:

a first control unit operable to record the video object onto the recording medium for the determined playback time length, even if a user makes a stop operation before the determined playback time length is reached;

a generating unit operable to generate cell information specifying, as a playback section, a part of the video object recorded up to a point at which the stop operation is made; and a second control unit operable to record program chain information containing the cell information onto the recording medium, wherein the playback time length is determined using the following equation:

$$\text{the playback time length} \geq \text{time } H/\alpha,$$

where the time H is calculated (i) by dividing a free capacity currently remaining in the recording medium by a bit rate set by the user for the recording device, or (ii) by depending on a record presetting made by the user, and $\alpha$ is a number of two or more pieces of playback section information that the generating unit is operable to generate.

5. A recording method for recording a digital stream onto a recording medium after determining a playback time length of the digital stream, comprising the steps of:

recording the digital stream onto the recording medium for the determined playback time length, even if a user makes a stop operation before the determined playback time length is reached;

generating playback section information specifying, as a playback section, a part of the digital stream recorded up to a point at which the stop operation is made; and recording playback path information containing the playback section information onto the recording medium, wherein the playback time length is determined using the following equation:

$$\text{the playback time length} \geq \text{time } H/\alpha,$$

where the time H is calculated (i) by dividing a free capacity currently remaining in the recording medium by a bit rate set by the user for the recording device, or (ii) by depending on a record presetting made by the user, and $\alpha$ is a number of two or more pieces of playback section information generable in the generating step by a generating unit.

* * * * *